A. B. J. FLOWERS.
Mower.
No. 20,416.
Patented June 1, 1858.
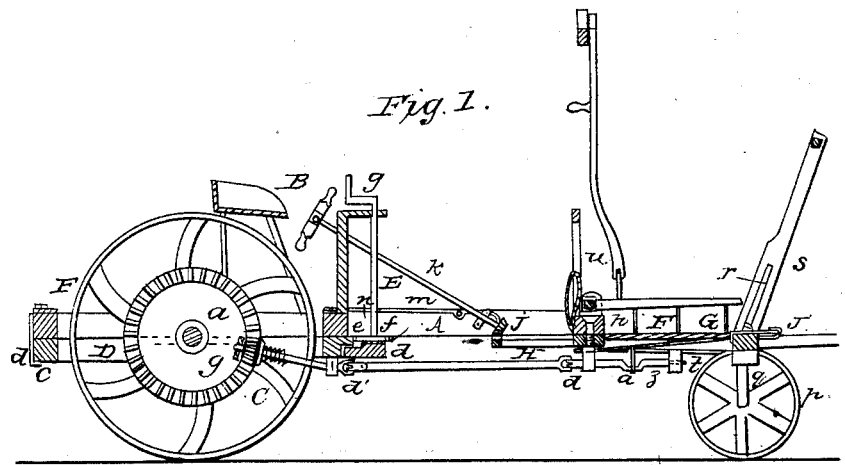
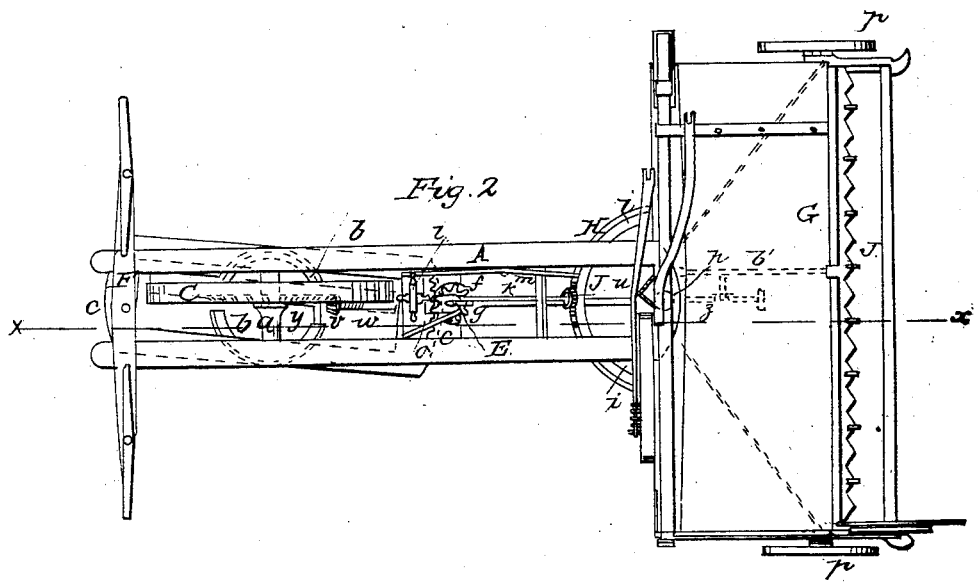

UNITED STATES PATENT OFFICE.

A. B. J. FLOWERS, OF GREENFIELD, INDIANA.

IMPROVEMENT IN HARVESTERS.

Specification forming part of Letters Patent No. 20,416, dated June 1, 1858.

*To all whom it may concern:*

Be it known that I, ANDREW B. J. FLOWERS, of Greenfield, in the county of Hancock and State of Indiana, have invented a new and useful Improvement in Reaping and Mowing Machines; and I do hereby declare that the following is a full, clear, and exact description of the same, reference being had to the annexed drawings, making a part of this specification, in which—

Figure 1 is a side sectional elevation of my improvement, taken in the line $x$ $x$, Fig. 2. Fig. 2 is a plan or top view of the same.

Similar letters of reference indicate corresponding parts in the two figures.

This invention relates to an improvement in that class of reaping and mowing machines in which the team is placed behind the cutting device.

The object of this invention is to obviate the difficulty attending the turning of this class of machines, and also to simplify the same, rendering them much less cumbersome than formerly, and at the same time retaining all the advantages they possess over the ordinary side-draft machines.

To enable those skilled in the art to fully understand and construct my invention, I will proceed to describe it.

A represents an oblong rectangular frame, on which the driver's seat is placed. The back end of this frame is supported by the driving-wheel C, the axis $a$ of which is fitted in a supplementary frame, D, placed underneath the frame A, and having two semicircular guides, $b$ $b$, attached to it, one at each side and to its upper surface, said guides fitting in corresponding recesses or grooves in the under side of the frame A. The ends $c$ $c$ of the frame D are curved, so as to be concentric with the guides $b$ $b$, and the ends $c$ are fitted in grooves or guides $d$, attached to the frame A. (See Fig. 1.)

On the front end of the frame D a rack, $e$, is formed, and a pinion, $f$, which is attached to the lower end of a rod, E, gears into rack $e$. The rod E has a crank, $g$, at its upper end, and is fitted in proper bearings, the crank $g$ being directly in front of the driver's seat B.

To the back end of the frame A the doubletree F is attached, and to the front end of said frame A a platform, G, is attached by a bolt, $h$, the bolt passing through the back end of the platform, which is allowed to turn freely on the bolt as a center.

H is a segmental rack, which is attached to arms $i$, which project from the back of the platform G. Into this rack H a pinion, $j$, gears, said pinion being attached to the lower end of an inclined rod, $k$, which is fitted in proper bearings attached to the frame A. The upper end of the rod $k$ has a hand-wheel, $l$, attached to it, said wheel being directly in front of the driver's seat.

To the frame A, at one side, a lever, $m$, is attached. The front end of this lever is bent downward, and is made to engage with the rack H, serving as a stop, preventing the casual moving of the platform, the lever being kept in such position by a spring, $n$. (See Fig. 1.) A similar lever, $o$, catches into or engages with the pinion $f$ to prevent the frame D of wheel C from casually moving. The front end of the platform G is supported by wheels $p$ $p$, one at each end, said wheels being connected to bars $q$, which are fitted in slots $r$, attached to bars $s$ on the platform. By this arrangement the platform may be raised and lowered by means of chains or cords $t$, connected to the bars $q$, and a lever, $u$. This arrangement of course is only necessary when the machine is used as a reaper. When used as a mowing-machine the platform is detached and a frame substituted, the frame being provided at its front end with shoes which rest upon the ground. This frame may be a permanent attachment, and so arranged that a platform, G, may be attached thereto, wheels $p$ $p$, and also a reel.

To one side of the driving-wheel C, and concontric with it, a bevel-wheel, I, is attached, and $v$ is a bevel-pinion, which gears into said wheel, said wheel being placed loosely on a shaft, $w$, which is fitted in bearings attached to the frame D. The pinion is of ratchet form at its outer face or end, and this ratchet-face is made to bear, by a spiral spring, $x$, against a pin, $y$, which passes through the shaft $w$, the ratchet-face of the pinion catching against the pin, and causing the shaft $w$ to rotate with it when being rotated in one direction; but if rotated in the other direction the ratchet-face of the pinion will slip over the pin and not turn the shaft.

To the under side of the platform G, or the frame thereof, there is attached a crank-shaft, $z$, which is connected by a rod, $a'$, with a lever, $b'$, one end of which is attached to the back side of the platform or its frame, and the opposite or front end attached to the reciprocating sickle J. The shaft $z$ is connected with the shaft $w$ by means of a shaft, $c'$, said shaft being connected with the shafts $w\ z$ by means of universal joints $d'$. (See Fig. 1.)

The operation is as follows: The driver on the seat B, when the machine is to be turned, cramps or turns the platform G, or the frame, by turning the hand-wheel $l$, the lever $m$ being previously raised by the foot, and also by turning the driving-wheel C, by actuating the rod E, the lever $o$ being freed from the pinion $f$, also, by means of the foot. The wheel C and platform G are turned in opposite positions relatively with each other, and thereby cause the machine in turning to describe a circle of small diameter. This machine may be operated with much less power than the ordinary side-draft machines. The team is not crowded or cramped at one side in turning, and the machine is rendered extremely simple, the sickle being driven from the wheel C without at all interfering with the movements of said wheel and the platform G, or the frame on which it is placed, in consequence of the separate shafts $w\ c'\ z$ being connected by the universal joints $d'$.

Having thus described my invention, what I claim as new, and desire to secure by Letters Patent, is—

1. Attaching the frame or platform G and wheel C to a frame, A, substantially as herein shown, so that both may be turned or cramped by the driver from his seat B, for the purpose of allowing the machine to be turned within a small compass.

2. Operating the sickle J from the driving-wheel C by means of the shafts $w\ c'\ z$, connected by universal joints $d'$ and attached to their respective frames, when said shafts thus jointed or connected are used in combination with the arrangement of the driving-wheel and platform, so that the whole may operate conjointly, as described.

A. B. J. FLOWERS.

Witnesses:
JOHN T. SEBASTIAN,
N. P. HOWARD.